United States Patent [19]

Kahn et al.

[11] Patent Number: 5,567,927
[45] Date of Patent: Oct. 22, 1996

[54] APPARATUS FOR SEMICONDUCTOR WAFER IDENTIFICATION

[75] Inventors: Randolph W. Kahn, Sherman; James C. Reed, Jr., Plano, both of Tex.

[73] Assignee: Texas Instruments Incorporated, Dallas, Tex.

[21] Appl. No.: 280,099

[22] Filed: Jul. 25, 1994

[51] Int. Cl.[6] .................................................... G06K 7/10
[52] U.S. Cl. .......................................... 235/462; 235/385
[58] Field of Search ................................... 235/383, 485, 235/483, 462, 385

[56] References Cited

U.S. PATENT DOCUMENTS

| 5,155,888 | 10/1992 | Lau | 29/25.01 |
| 5,287,414 | 2/1994 | Foster | 235/383 |

FOREIGN PATENT DOCUMENTS

| 0004870 | 1/1981 | Japan | 235/385 |
| 4185397 | 10/1992 | Japan | 235/385 |
| 5144147 | 9/1993 | Japan | 235/385 |

OTHER PUBLICATIONS

Thomas Chisholm, et al., "Backside Wafer Identification Using BC 412* Bar Code", *Computer Identics Corporation*, Sep. 1, 1992, pp. 1–17.

Author unknown, "Scanstar 10W Intelligent Miniature Bar Code Scanner for Semiconductor Wafer Identification", *Computer Identics*, printed in USA May 1991, pp. 1–2.

Author unknown, "Specification for Back Surface Bar Code Marking of Silicon Wafers", *SEMI T1–93 SEMI 1993*, pp. 1–9.

*Primary Examiner*—Donald T. Hajec
*Assistant Examiner*—Thien Minh Le
*Attorney, Agent, or Firm*—W. Daniel Swayze, Jr.; W. James Brady, III; Richard L. Donaldson

[57] ABSTRACT

The apparatus (10) includes a batch wafer presentation system (12) receiving a cassette (14) carrying a plurality of wafers (16). The batch wafer presentation system (12) arranges the plurality of wafers (16) along an inclined presentation axis, α, to simultaneously expose the bar code inscription on each wafer (16). A laser scanner (30) is mounted on an arm assembly (32) which travels long a track (34) parallel with the presentation axis. The laser scanner (30) is mounted such that its angular and spatial positions relative to the plurality of wafers (16) may be easily adjusted.

10 Claims, 2 Drawing Sheets

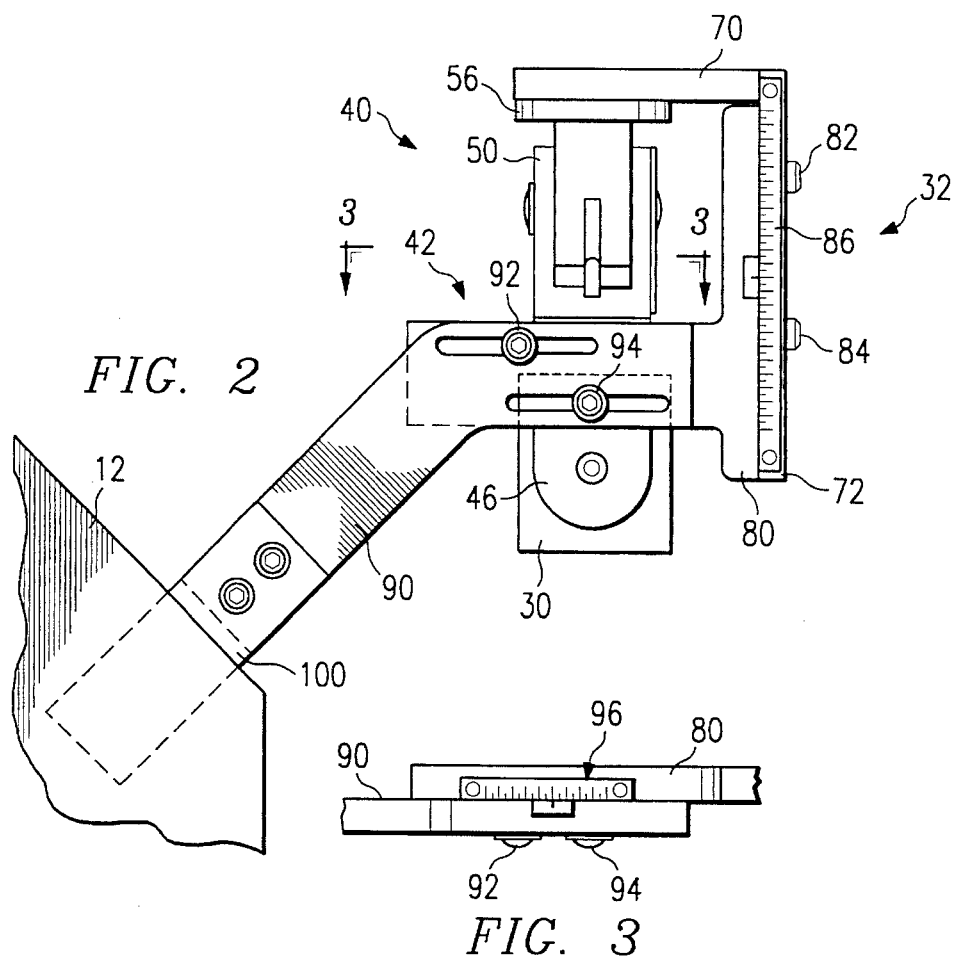
FIG. 2
FIG. 3
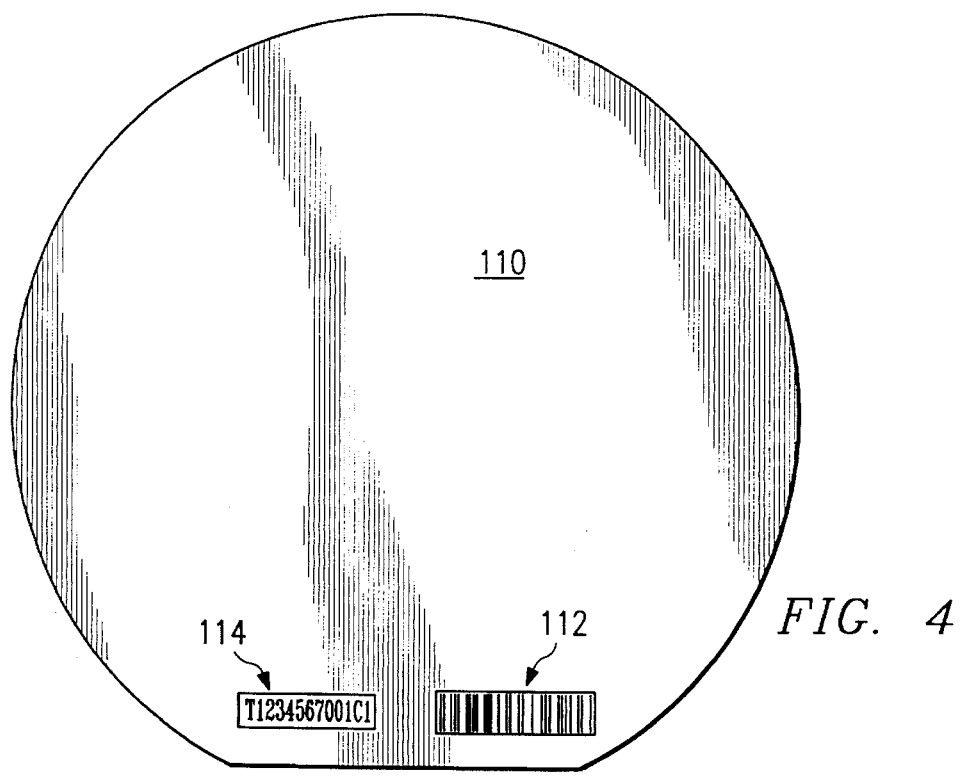
FIG. 4

5,567,927

APPARATUS FOR SEMICONDUCTOR WAFER IDENTIFICATION

TECHNICAL FIELD OF THE INVENTION

This invention relates in general to the field of semiconductor processing and handling devices. More particularly, the present invention relates to apparatus for identifying semiconductor wafers by bar codes.

BACKGROUND OF THE INVENTION

In a wafer fabrication facility, semiconductor processes are typically performed on groups of 25 to 50 wafers. Each such group of wafers is termed a "lot". Semiconductor processing is thus generally tracked, controlled and analyzed at the lot level and wafers in a lot are not individually distinguished. Therefore, it is difficult to determine the exact process conditions of each wafer due to process variations within each run. However for the purposes of quality assurance and quality control, it is highly desirable to track individual wafers through the entire semiconductor process. Process validation of each individual wafer becomes possible with wafer tracking to prevent misprocessing. Wafer sequential and positional data also give more meaning to the yield and parametric analyses of equipment and process. Additionally, when wafers can be separately identified, wafer mishandling that results in mixed lots can be easily identified and sorted.

Previously, optical character recognition (OCR) has been used to read alphanumeric markings inscribed on wafers for wafer identification. However, the use of optical character recognition has been expensive and problematic. This method uses video imaging to recognize the alphanumeric characters, thus requiring sophisticated computer hardware and software. Because the alphanumeric string is inscribed on a highly reflective surface, precise lighting and camera angles are crucial to successful reading. In addition, there must not be any movement or vibration of the camera or wafer when character recognition is taking place. Any partial obstruction of the alphanumeric markings may also cause the character recognition to fail.

International Business Machines (IBM) has developed a bar code format BC412 that has been adopted as a standard by Semiconductor Equipment and Materials International (SEMI). IBM employs BC412 bar code inscription on the backsides of the wafers for wafer identification. However, the bar code technology has yet to be successfully applied in a high volume wafer fabrication production environment where wafer tracking is particularly beneficial.

The task of applying the bar code technology to a production environment is not trivial. Each wafer fabrication step alters the surface characteristics of the wafer as well as any inscription used for wafer identification. The inscription must survive ion implantation, diffusion, photolithography, metalization, plasma etch, wet etch, oxide deposition, and any other fabrication process and remain readable.

Accordingly, it is desirable to identify and track individual wafers in a high volume production environment without many of the disadvantages and constraints of optical character recognition.

SUMMARY OF THE INVENTION

In accordance with the present invention, apparatus for semiconductor wafer identification is provided which eliminates or substantially reduces the disadvantages associated with prior systems.

In one aspect of the invention, the apparatus includes a batch wafer presentation system receiving a cassette carrying a plurality of wafers. The batch wafer presentation system arranges the plurality of wafers along an inclined presentation axis to simultaneously expose the bar code inscription on each wafer. A laser scanner is mounted on an arm assembly which travels long a track parallel with the presentation axis. The laser scanner is mounted such that its angular and spatial positions relative to the plurality of wafers may be easily adjusted.

In another aspect of the invention, the laser scanner is mounted on an angular position mount, which may adjustably and rotatably position the laser scanner about a first, second and third axes. Rotational graduated scales are also provided to indicate the angular position of the laser scanner about the respective axes. The arm assembly further includes a linear position mount coupled to the angular position mount for adjustably linearly positioning the laser scanner along the same three axes. Linear graduated scales indicative of the linear position of the laser scanner along said respective axes are also provided.

BRIEF DESCRIPTION OF THE DRAWINGS

For a better understanding of the present invention, reference may be made to the accompanying drawings, in which:

FIG. 2 is a partial side view of an embodiment of the apparatus;

FIG. 3 is a partial view of a scaled alignment mechanism; and

FIG. 4 is a top view of a wafer inscribed with bar code and alphanumeric string.

DETAILED DESCRIPTION OF THE INVENTION

Figure 1:
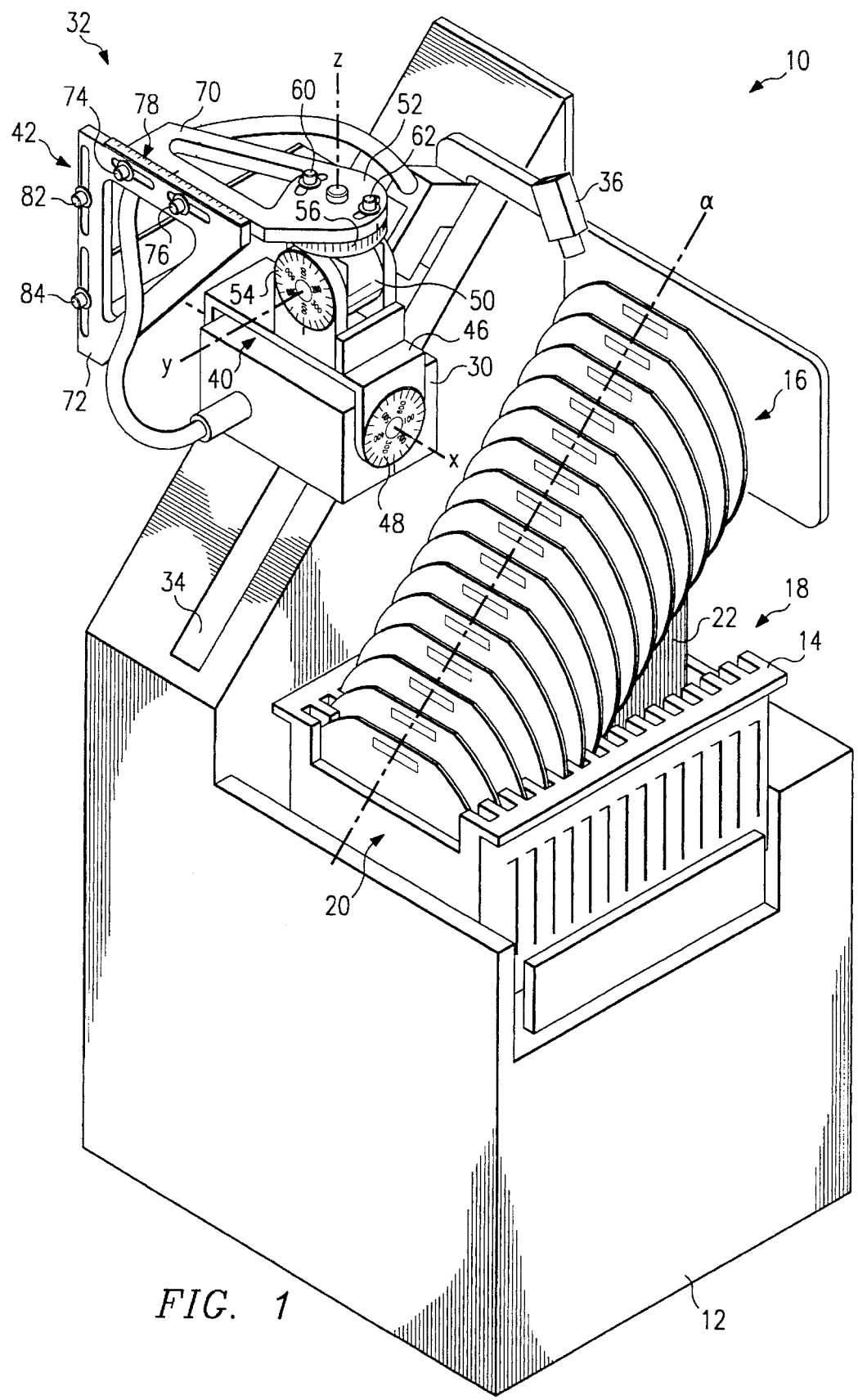
FIG. 1 is a perspective view of an embodiment of apparatus for wafer identification.

The preferred embodiment of the present invention and its advantages are best understood by referring to FIGS. 1–4 of the drawings, like numerals being used for like and corresponding parts of the various drawings.

Referring to FIGS. 1 and 2, an embodiment of the apparatus 10 for identifying semiconductor wafers in a production environment is shown. The apparatus 10 includes a batch wafer presentation device 12, which accepts a cassette 14 with semiconductor wafers 16 loaded in each cassette slot. As shown, the cassette 14 is loaded into the wafer identification apparatus 10 with its H-bar end 18 toward the back and its U-end 20 toward the front of the apparatus 10. By convention, the slots in the cassette are numbered consecutively from slot number 1 at the H-bar end 18 to slot number 25 at the U-end 20. The slots hold and separate the wafers such that each is spaced from one another. The batch wafer presentation device 12 is equipped with a support member 22 having an inclined surface. During operation, the inclined surface is urged upward to lift the wafers 16 so that the wafers 16 are aligned along a presentation axis, α, with the front surface of each wafer being partial exposed. The batch wafer presentation device 12 is further equipped with a flat finder mechanism (not shown) capable of rotating each wafer until its flat edge faces upward. Operating in this manner, the bar code labels of each wafer 16 is properly positioned and exposed for laser scanning. For details of the batch wafer presentation device 12, please refer to U.S. Pat. No. 5,155,888 titled Semiconductor Wafer Lifter, issued to Lau on Oct. 20, 1992, and assigned to Mactronix of Dallas, Tex., incorporated herein by reference.

The wafer identification apparatus 10 is further equipped with a laser scanner 30 mounted on an arm assembly 32 attached to a track system 34 in the batch wafer presentation device 12. The track system 34 is generally parallel with the α axis of the wafers and is capable of smoothly guiding and moving the laser scanner 30 along a line parallel to the α axis, so that the bar codes on the wafers 16 may be successively scanned. Because the laser scanner 30 is capable of performing a large number of scans per second, no pause at each wafer is required during the scanning process. The total travel time from the top of the track 34 to the bottom of the track may be as short as 30 seconds. Miniature laser scanners such as the SCANSTAR™ 10W manufactured by Computer Identics Corporation of Canton, Mass. may be used to scan the bar codes.

A wafer sensor 36 is further provided to detect whether wafers are present in each of the slots as it and the arm assembly 32 travel from the top to the bottom of the track 34. Using the wafer sensor 36, a correlation is made between the bar code being read by the laser scanner 30 and the physical location or slot number of the wafer in the cassette 14. Thus the wafer sensor 36 also performs an indexing function. Suitable proximity sensors may be used to accomplish the function of the wafer sensor 36.

Because the optimal angular and spatial position of the laser scanner 30 may vary depending on the extent that the wafers have been processed, it is highly desirable to provide the capability to easily and quickly modify the position of the laser scanner 30. The arm assembly 32 includes an angular position mount 40 and a linear position mount 42. Because the wafer surfaces on which the bar codes are inscribed are highly reflective, the laser scanner 16 is preferably positioned so that glare does not impair its function. Because the laser beam must simultaneously scan the entire width of the bar code, a large skew or non-perpendicularity between the laser beam and the bar code is unacceptable. Therefore, the angular and spatial position of the laser scanner 30 are adjustable to achieve optimum bar code scanning.

The angular position mount 40 includes a U-shaped bracket 46 holding the laser scanner 30. The bracket 46 permits the laser scanner 30 to have a range of rotational freedom about an X-axis, and the rotational position of which may be fixed by tightening the bracket about the laser scanner 30 with fasteners such as bolts and washers and the like. Rotation of the laser scanner 30 along the X-axis thus varies the angle of the laser scanner 30 with respect to the horizontal. The angular position of the laser scanner 30 may be noted by a graduated scale 48. The angular position mount 40 further provides the laser scanner 30 a range of rotational freedom about the Y- and Z-axes with a pendulum mounting member 50 and a vertical rotational mount 52, each equipped with a graduated scale 54 and 56 to provide angular position references about the respective axes. As shown, movement about the Z-axis may be accomplished by loosening fasteners or bolts 60 and 62, adjusting the angular position of the laser scanner 30 and tightening the bolts 60 and 62 after achieving the desired position.

The arm assembly further includes the linear position mount 42. The linear position mount 42 provides spatial adjustment of the laser scanner 30 along the X-, Y- and Z-axes. A top bracket 70 is used to attach the angular position mount 40 to the linear position mount 42. The top bracket 70 is further adjustably attached to a triangular bracket 72. The relative position of the top bracket 70 and the triangular bracket 72 is variable to provide the ability to align the laser scanner 30 with the wafers 16 along the X-axis. Bolts 74 and 76 slidable along their respective slots are used to fix and adjust the X-axis displacement between the brackets 70 and 72. A graduated scale 78 is provided to note the linear position or displacement.

The triangular bracket 72 is further adjustably attached to a side bracket 80. The relative position of the triangular bracket 72 and side bracket 80 is variable to provide the ability to adjust the position of the laser scanner 30 along the Z-axis or the height of the laser scanner 30 with respect to the wafers 16. Bolts 82 and 84 and their respective slots are provided to tighten and loosen the connection between the brackets 72 and 80. A graduated scale 86 is further provided to note the height adjustment of the laser scanner 30.

The side bracket 80 is further coupled to a mounting plate 90. This connection provides the ability to adjust the position of the laser scanner along the Y-axis or the distance between the laser scanner 30 and the wafers 16. Fasteners or bolts 92 and 94 and their respective slots are used to tighten and loosen the connection and fix the position. A graduated scale 96 is also provided for positional reference along the Y-axis. Preferably, the arm assembly 32 is detachably coupled to an arm assembly mount 100 which is directly coupled to the track system 34.

FIG. 4 shows a wafer 110 having a bar code inscription 112 on its front side. For comparison, an alphanumeric marking 114 used in optical character recognition is also shown. The bar code inscription 112 generally follows the BC412 bar code symbology developed by IBM and adopted by SEMI as a standard for silicon wafer identification markings. In BC412, bars are of uniform width and the spacing therebetween are of unequal width. The alphanumeric characters are constructed from four bars with one to five spaces between the bars. The bar code format consists of a leading quiet zone, a start character, a checksum character, base$_{35}$ user definable characters, a stop character, and a trailing quiet zone. Examples of the user definable characters may include supplier ID, lot number, wafer sequence number, and other wafer identification data. Additional details of the BC412 symbology are set forth in SEMI document TI-93, *Specification for Back Surface Bar Code Marking of Silicon Wafers.*

Although not shown, the wafer identification apparatus 10 may be linked to a computer which receives the bar code read by the laser scanner 30. The bar codes are translated to base$_{10}$ human readable alphanumeric characters and/or ASCII characters and may be stored for future reference. A computer software titled *Wafer Sleuth* developed by SEMATECH, INC. may be used to associate the bar code data and the lot number and perform additional wafer tracking functions during the semiconductor fabrication processes.

Although the present invention and its advantages have been described in detail, it should be understood that various changes, substitutions and alterations can be made therein without departing from the spirit and scope of the invention as defined by the appended claims.

What is claimed is:

1. Apparatus for identifying a plurality of semiconductor wafers residing in a plurality of slots of a cassette, each of said plurality of semiconductor wafers having a bar code inscription thereon, the apparatus comprising:

a batch wafer presentation system for receiving said cassette carrying said plurality of semiconductor wafers, said presentation system arranging said plurality of wafers along a presentation axis to expose said bar code inscription on each of said plurality of semiconductor wafers;

a laser scanner; and an arm assembly coupled to said batch wafer presentation system and controllably moveable along a track parallel with said presentation axis, said arm assembly securing said laser scanner in an adjustable angular and spatial position relative to said plurality of semiconductor wafers, wherein said arm assembly further comprises an angular position mount adjustably rotatably positioning said laser scanner about a first, second and third axes and having first, second and third rotational graduated scales indicative of the angular position of said laser scanner about said respective axes.

2. The apparatus, as set forth in claim 1, wherein said apparatus further comprises a wafer sensor coupled to said arm assembly and moveable therewith, said wafer sensor generating a wafer present signal in response to detecting a wafer residing in a respective slot as said arm assembly moves along said track.

3. Apparatus for identifying a plurality of semiconductor wafers residing in a plurality of slots of a cassette, each of said plurality of semiconductor wafers having a bar code inscription thereon, the apparatus comprising:

a batch wafer presentation system for receiving said cassette carrying said plurality of semiconductor wafers, said presentation system arranging said plurality of wafers along a presentation axis to expose said bar code inscription on each of said plurality of semiconductor wafers;

a laser scanner; and an arm assembly coupled to said batch wafer presentation system and controllably moveable along a track parallel with said presentation axis, said arm assembly securing said laser scanner in an adjustable angular and spatial position relative to said plurality of semiconductor wafers, wherein said arm assembly further comprises a linear position mount coupled to said angular position mount adjustably linearly positioning said laser scanner along a first, second and third axes and having first, second and third linear graduated scales indicative of the linear position of said laser scanner along said respective axes.

4. The apparatus, as set forth in claim 3, further comprising means for associating said bar codes with a sequential position of said wafers in said cassette.

5. Apparatus for identifying a plurality of semiconductor wafers residing in a plurality of slots of a cassette, each of said plurality of semiconductor wafers having a bar code inscription thereon, the apparatus comprising:

a batch wafer presentation system for receiving said cassette carrying said plurality of semiconductor wafers, said presentation system arranging said plurality of wafers along a presentation axis to expose said bar code inscription on each of said plurality of semiconductor wafers;

a laser scanner; and an arm assembly coupled to said batch wafer presentation system and controllably moveable along a track parallel with said presentation axis, said arm assembly securing said laser scanner in an adjustable angular and spatial position relative to said plurality of semiconductor wafers, wherein said arm assembly comprises:

a U-bracket adjustably securing said laser scanner, said U-bracket providing said laser scanner an angular range of adjustment about a first axis;

a pendulum mount coupled to said U-bracket and providing said laser scanner an angular range of adjustment about a second axis; and a vertical rotational mount coupled to said pendulum mount and providing said laser scanner an angular range of adjustment about a third axis.

6. The apparatus, as set forth in claim 5, wherein said arm assembly comprises:

a top bracket coupled to said vertical rotational mount;

a triangular bracket adjustably coupled to said top bracket and providing a linear range of adjustment along said first axis;

a side bracket adjustably coupled to said triangular bracket and providing a linear range of adjustment along said third axis; and a mounting plate coupled to said track and adjustably coupled to said side bracket and providing a linear range of adjustment along said second axis.

7. An integrated wafer identification apparatus for a wafer fabrication facility, comprising:

a wafer cassette having a plurality of slots;

a plurality of wafers having a bar code inscription at a predetermined location thereon while residing in said slots;

a wafer lifter for receiving said cassette and carrying said plurality of wafers, said wafer lifter staggering said plurality of wafers along an inclined presentation axis to expose said bar code inscription on each of said plurality of wafers;

a laser scanner scanning and reading said bar code inscription;

an arm assembly coupled to said wafer lifter and controllably moveable along a track parallel with said presentation axis, said arm assembly securing said laser scanner in an adjustable angular and spatial position relative to said plurality of wafers; and a wafer sensor coupled to said arm assembly and moveable therewith, said wafer sensor generating a wafer present signal in response to detecting a wafer residing in a respective slot as said arm assembly moves along said track, wherein said arm assembly further comprises an angular position mount adjustably rotatably positioning said laser scanner about a first, second and third axes and having first, second and third rotational graduated scales indicative of the angular position of said laser scanner about said respective axes.

8. An integrated wafer identification apparatus for a wafer fabrication facility, comprising:

a wafer cassette having a plurality of slots;

a plurality of wafers having a bar code inscription at a predetermined location thereon while residing in said slots;

a wafer lifter for receiving said cassette and carrying said plurality of wafers, said wafer lifter staggering said plurality of wafers along an inclined presentation axis to expose said bar code inscription on each of said plurality of wafers;

a laser scanner scanning and reading said bar code inscription;

an arm assembly coupled to said wafer lifter and controllably moveable along a track parallel with said presentation axis, said arm assembly securing said laser scanner in an adjustable angular and spatial position relative to said plurality of wafers; and a wafer sensor coupled to said arm assembly and moveable therewith, said wafer sensor generating a wafer present signal in response to detecting a wafer residing in a respective slot as said arm assembly moves along said track, wherein said arm assembly further comprises a linear position mount coupled to said angular mount adjustably linearly positioning said laser scanner along a first, second and third axes and having first, second and third linear graduated scales indicative of the linear position of said laser scanner along said respective axes.

9. An integrated wafer identification apparatus for a wafer fabrication facility, comprising:

a wafer cassette having a plurality of slots;

a plurality of wafers having a bar code inscription at a predetermined location thereon while residing in said slots;

a wafer lifter for receiving said cassette and carrying said plurality of wafers, said wafer lifter staggering said plurality of wafers along an inclined presentation axis to expose said bar code inscription on each of said plurality of wafers;

a laser scanner scanning and reading said bar code inscription;

an arm assembly coupled to said wafer lifter and controllably moveable along a track parallel with said presentation axis, said arm assembly securing said laser scanner in an adjustable angular and spatial position relative to said plurality of wafers; and a wafer sensor coupled to said arm assembly and moveable therewith, said wafer sensor generating a wafer present signal in response to detecting a wafer residing in a respective slot as said arm assembly moves along said track, wherein said arm assembly comprises:

a U-bracket adjustably securing said laser scanner, said U-bracket providing said laser scanner an angular range of adjustment about a first axis;

a pendulum mount coupled to said U-bracket and providing said laser scanner an angular range of adjustment about a second axis; and a vertical rotational mount coupled to said pendulum mount and providing said laser scanner an angular range of adjustment about a third axis.

10. The apparatus, as set forth in claim 9, wherein said arm assembly comprises:

a top bracket coupled to said vertical rotational mount;

a triangular bracket adjustably coupled to said top bracket and providing a linear range of adjustment along said first axis;

a side bracket adjustably coupled to said triangular bracket and providing a linear range of adjustment along said third axis; and a mounting plate coupled to said track and adjustably coupled to said side bracket and providing a linear range of adjustment along said second axis.

* * * * *